United States Patent

Juchem et al.

[11] Patent Number: 5,769,456
[45] Date of Patent: Jun. 23, 1998

[54] PRE-FITTED CARRIER UNIT FOR THE FUNCTIONAL PARTS OF A SAFETY BELT SYSTEM

[75] Inventors: Alois Juchem, Maisach; Andreas Bissinger; Edmund Lochbihler, both of München; Ralf Glässner, Dachau; Marcus Piege, München; Dieter Schaper, Eisenhofen, all of Germany

[73] Assignee: Autoliv Development AB, Vargarda, Sweden

[21] Appl. No.: 656,248

[22] PCT Filed: Dec. 2, 1994

[86] PCT No.: PCT/SE94/01164

§ 371 Date: Jul. 26, 1996

§ 102(e) Date: Jul. 26, 1996

[87] PCT Pub. No.: WO95/15270

PCT Pub. Date: Jun. 8, 1995

[30] Foreign Application Priority Data

Dec. 2, 1993 [DE] Germany ............................ 43 41 119.3

[51] Int. Cl.[6] ........................... B60R 22/18; B60R 22/34; B60R 22/46
[52] U.S. Cl. ............................................................. 280/808
[58] Field of Search ................................ 280/801.2, 808

[56] References Cited

U.S. PATENT DOCUMENTS 5,207,453  5/1993  Stedman et al. ........................ 280/808

FOREIGN PATENT DOCUMENTS

| 2619773 | 3/1989 | France . | |
|---|---|---|---|
| 2822210 | 11/1979 | Germany . | |
| 2932505 | 2/1981 | Germany . | |
| 3334510 | 3/1984 | Germany . | |
| 3426207 | 3/1986 | Germany . | |
| 3530495 | 3/1987 | Germany . | |
| 3714644 | 12/1988 | Germany . | |
| 3715845 | 1/1989 | Germany . | |
| 3924670 | 2/1990 | Germany . | |
| 4327717 | 2/1995 | Germany . | |
| 166637 | 7/1988 | Japan | 280/808 |
| 282055 | 11/1989 | Japan | 280/808 |

*Primary Examiner*—Kenneth R. Rice
*Attorney, Agent, or Firm*—Robert W. Becker & Associates

[57] ABSTRACT

A safety belt carrier unit for mounting on a vehicle anchorage has a carrier unit and functional parts of a safety belt system connected to the carrier unit, wherein at least one of said functional parts is displaceable relative to the carrier unit. Upon mounting the carrier unit on the vehicle anchorage, the at least one functional part becomes operatively connected to the vehicle anchorage upon displacement relative to the carrier unit.

24 Claims, 4 Drawing Sheets

PRE-FITTED CARRIER UNIT FOR THE FUNCTIONAL PARTS OF A SAFETY BELT SYSTEM

BACKGROUND OF THE INVENTION

THE INVENTION relates to a carrier unit for the functional parts of a safety belt system, such unit being adapted to be fitted to a motor vehicle anchorage.

During the assembly of motor vehicles, it is conventional practice for the functional parts of a safety belt system, such as the belt retractor and/or pillar loop and/or height adjustment mechanism for the pillar loop and/or a clamping mechanism for the belt and/or tightening mechanisms each to be fitted separately and individually on the B-column of a motor vehicle, aligned, and usually secured by screws. A cover, usually of plastic, engaging over the B-column with the functional parts fitted thereon, is subsequently fitted and also secured to the B-column. The disadvantage of this mode of assembly is that numerous individual steps are required. Additionally there is the problem that the safety belt must still be passed through the subsequently fitted cover since the functional parts are already fitted to the B-column.

The object of the present invention, therefore, is to simplify the fitting of the functional parts of a safety belt system to the motor vehicle.

SUMMARY OF THE INVENTION

According to this invention there is provided a carrier unit carrying the functional parts of a safety belt system, the combination of the carrier and the functional parts being adapted to be mounted on a vehicle anchorage, said functional parts comprising the belt retractor and/or the pillar loop and/or a height adjustment mechanism for a pillar loop and/or a clamping mechanism for the belt and/or a tightening mechanism, wherein at least one of the functional parts is disposed on the carrier unit for displacement relatively thereto to become operatively connected to the anchorage by means of said displacement which can be effected when the carrier unit is fitted on the anchorage.

The safety belt carrier unit for mounting on a vehicle anchorage according to the present invention is primarily characterized by:

a carrier unit;

functional parts of a safety belt system connected to the carrier unit, wherein at least one of the functional parts is displaceable relative to the carrier unit;

wherein, upon mounting the carrier unit on the vehicle anchorage, the at least one functional part becomes operatively connected to the vehicle anchorage upon displacement relative to the carrier unit.

The functional parts are selected from the group consisting of a belt retractor, a pillar loop, a height adjustment mechanism for a pillar loop, a clamping mechanism for a safety belt, and a tightening mechanism.

Preferably, the functional parts include the height adjustment mechanism and the belt retractor. The carrier unit has a top end and a bottom end and the height adjustment mechanism is displaceably connected to the top end, while the belt retractor is connected to the bottom end. The height adjustment mechanism has at least one upwardly open U-shaped hook for engagement of the vehicle anchorage. The belt retractor has at least one upwardly open U-shaped hook for engagement of the vehicle anchorage.

Expediently, the safety belt carrier unit further comprises catch means, wherein the height adjustment mechanism is fixed by the catch means in an end position after displacement.

Advantageously, the safety belt carrier unit comprises screws, wherein the carrier unit is fastened by the screws to the vehicle anchorage after completion of displacement. The screws extend through the height adjustment mechanism and the belt retractor, respectively, in respective end positions after displacement.

The screw extending through the belt retractor preferably retains the lap part of the safety belt.

Advantageously, the functional parts include the height adjustment mechanism and the belt retractor. The carrier unit has a top end and a bottom end and the height adjustment mechanism is displaceably connected to the top end while the belt retractor is displaceably connected to the bottom end. The height adjustment mechanism has at least one U-shaped hook, open toward the belt retractor, for engagement of the vehicle anchorage. The belt retractor is displaceable and has at least one U-shaped hook, open toward the height adjustment mechanism, for engagement of the vehicle anchorage.

The safety belt carrier unit expediently further comprises catch means, wherein at least one of the height adjustment mechanism and the belt retractor is fixed by the catch means in an end position after displacement.

The safety belt carrier unit may also further comprise screws, wherein the carrier unit is fastened by the screws to the vehicle anchorage after completion of displacement, the screws extending through the height adjustment mechanism and the belt retractor, respectively, in end positioned thereof after displacement.

The screw extending through the belt retractor retains the lap part of the safety belt.

The safety belt carrier unit may comprise snap-in/catch connections for retaining the carrier unit on the vehicle anchorage.

In one embodiment of the present invention, the functional parts include the height adjustment mechanism, the belt retractor, the tightening mechanism, and the clamping mechanism, the tightening mechanism disposed on the belt retractor and the clamping mechanism connected to the tightening mechanism, wherein the height adjusting mechanism and the tightening mechanism are displaceably connected to the carrier unit to become operatively connected to the vehicle anchorage upon displacement relative to the carrier unit.

A fixing element may be provided so as to be displaceably connected to the carrier unit, wherein the tightening mechanism is connected to the fixing element, wherein the fixing element becomes operatively connected to the vehicle anchorage upon displacement relative to the carrier unit, wherein the carrier unit has a top end and a bottom end, and wherein the height adjusting mechanism is connected to the top end and has at least one U-shaped hook, open toward the tightening mechanism, for engaging the vehicle anchorage.

In this embodiment, the belt retractor is preferably stationarily connected to the carrier unit.

The fixing element is expediently a fixing plate with a central aperture for receiving the tightening mechanism. The fixing plate has a hook open toward the height adjusting mechanism for engaging the vehicle anchorage. The fixing plate has spring projections for engaging catch apertures of the vehicle anchorage.

According to another embodiment, the fixing element is a U-shaped stirrup with limbs engaging the tightening mechanism, wherein the limbs have end faces with catch projections for engaging the vehicle anchorage.

The safety belt carrier unit may further comprise a force limiter unit connected to the carrier unit, wherein the tightening mechanism is connected to the force limiter unit.

The safety belt carrier unit may also have a rotatable rod having a locking crank for engaging the vehicle anchorage and a screw aperture for non-rotatably fastening the rod is provided, wherein the rod is located at an end of the carrier unit to which the belt retractor is connected.

The rod preferably supports the lap part of the safety belt.

In one embodiment of the invention, a U-shaped stirrup with limbs engaging at least one of the functional parts may be provided, wherein the limbs have end faces with catch projections for engaging the vehicle anchorage.

The carrier unit is preferably a U-shaped plastic cover enclosing the functional parts and connected to the vehicle anchorage.

The cover is designed so as to have stability sufficient to withstand loads to which the belt retractor is subjected during normal operation.

The vehicle anchorage may be the B-column and C-column of the vehicle.

It is also possible to use a seat of the vehicle as the vehicle anchorage.

The basic idea of the invention therefore lies in constructing a carrier unit for the functional parts of the safety belt system, such unit being adapted for fitting to a motor vehicle anchorage, wherein at least one of the said functional parts is disposed on the carrier unit for displacement relatively thereto and to become operatively connected to the anchorage by a displacement which can be carried out when the carrier unit is fitted to the anchorage. This has the advantage that a carrier unit with all the functional parts of the safety belt system disposed thereon can be "prefabricated" so that the final fitting of this carrier unit to the anchorage during the vehicle assembly is reduced to a few operations. A particular advantage in this respect is that the individual functional parts of the safety belt system are no longer separately connected to the anchorage, and instead the functional parts are themselves hooked or engaged on the anchorage by the displacement effected during the final fitting of the carrier unit to the anchorage, so that they become permanently connected so as to transmit forces. In particular, corresponding projections, catches, spring constructions, etc., are used for this purpose, as will be described in connection with the preferred embodiments of the invention. Advantageously, this reduces the provision of screws or completely eliminates or renders screws superfluous.

The displacement of at least one functional part or the carrier unit itself, as referred to during the final fitting of the carrier unit, can be effected in various ways. One particular possibility described hereinafter, in the case of two functional parts each disposed displaceably on the carrier unit, is to move the functional parts towards one another by tension applied to the belt, thus establishing the operative connection; alternatively, the displacement of the functional parts can be produced by a separate tool applied from the outside through the carrier unit while the latter is being fitted. This is particularly advantageous if only one functional part is pre-fitted for displacement on the carrier unit, because this displacement can then easily be produced by a manual movement.

In utilising the invention, the fitting to the vehicle of the complete shoulder and lap belt with all its components, for example the belt retractor, height adjustment mechanism, etc., can be shifted away from the motor vehicle assembly line at the motor vehicle manufacturers, to the delivery garage. Consequently the assembly time for the motor vehicle itself is greatly reduced.

The displacement proposed for at least one of the functional parts relative to the carrier unit also has the advantage that it is possible to compensate for any production tolerances between the carrier unit and the B-column. Thus production of the parts is acceptable with wide tolerances, reducing manufacturing costs.

Another advantage of the preferred embodiments of the invention lies in the fact that the individual functional parts of the safety belt system are so arranged on the carrier unit that when the motor vehicle is being dismantled, after the expiry of the useful vehicle life, it is possible to remove the carrier unit easily from the motor vehicle with the functional parts of the safety belt system mounted thereon.

The carrier unit may be fitted not only on the B-column but also on the C-column of a vehicle as the anchorage. Alternatively the carrier unit may be adapted to be mounted on a passenger seat, which can also be regarded as an anchorage, in cases in which a seat-integrated safety belt system is provided.

In a first preferred embodiment of the invention, the functional parts of the relevant safety belt system are just the belt retractor and a height adjustment mechanism for the return fitting of the shoulder belt part, and accordingly, only these two parts are pre-fitted to the carrier unit. The belt retractor pre-fitted at the bottom end of the carrier unit and the height adjustment mechanism pre-fitted at the top end of the carrier unit each have, on the housing side, U-shaped hooks open at the top for engagement in the anchorage, the belt retractor being disposed on the carrier unit to be stationary while the height adjustment mechanism is disposed thereon for displacement. Accordingly, the carrier unit can be so fitted as to be attached, for example, to the B-or C-column and then moved upwards as a whole until the U-shaped hooks of the belt retractor lock; the upwardly directed displacement of the height adjusting mechanism is then carried out manually from outside until the hooks disposed on the height adjustment mechanism engage in the anchorage.

In a modification of the above-described embodiment, in another embodiment of the invention, the belt retractor and pillar loop or height adjustment mechanism are both pre-fitted on the carrier unit for displacement, the belt retractor pre-fitted at the bottom end of the carrier unit having, on the housing side, U-shaped hooks open towards the height adjustment mechanism for engagement in the anchorage while the adjustment mechanism pre-fitted at the top end of the carrier unit has, on the housing side, U-shaped hooks open towards the belt retractor for engagement in the anchorage. When tension is applied to the belt during fitting after the belt retractor has thus been locked the parts which are disposed displaceably on the carrier unit are moved towards one another so that the correspondingly contra-directionally arranged U-shaped hooks come into engagement with the anchorage and become operatively connected thereto.

At the same time, provision can be made for the pillar loop or the height adjustment mechanism and/or the belt retractor to be securable in their end position on the carrier unit by catch means after completion of the displacement movement produced by fitting, in order thus to ensure a rattle-free arrangement of the functional parts.

Alternatively, or additionally, the carrier unit can be fixed on the anchorage after completion of the displacement movement by means of screws, the latter at the same time extending through the height adjustment mechanism and the belt retractor at one point and thus providing rattle-free fixing of these functional parts.

In addition, the screw for fixing the carrier unit including the belt retractor can also serve to fix the lap part of the belt or the associated end fitting so that the same can take the required forces. In another embodiment of the invention, in addition to the pillar loop or the height adjustment mechanism and the belt retractor, a tightening mechanism and a clamping mechanism are provided for the belt. The clamping mechanism may be coupled to the tightening mechanism. The tightening mechanism may operate when activated, to displace the clamping mechanism in the tightening direction so that the belt clamped in the clamping mechanism is tightened. In one example of such an embodiment of the invention, only the pillar loop or the height adjustment mechanism and the tightening mechanism are secured displaceably on the carrier unit and engage the anchorage so as to transmit any loads, while the clamping mechanism and the belt retractor are fitted only on the carrier unit.

In a further embodiment of the invention, the tightening mechanism is connected to the anchorage by appropriate U-shaped hooks in the same way as in the first exemplified embodiment, or a special fixing element is provided for the tightening mechanism to connect the latter to the anchorage.

In this exemplified embodiment of the invention, the belt retractor is fixed on the carrier unit to be stationary, the carrier unit being of such stable construction that it can take the loads that the belt retractor is required to take in normal operation. In this embodiment, the belt retractor takes no load caused by a crash, because this is taken by the clamping mechanism, which is in turn rigidly connected to the tightening mechanism so that the force is dissipated via the tightening mechanism and the fixing element which connects the latter to the anchorage.

In one embodiment of the invention, the fixing element is constructed as a fixing plate which accommodates the tightening mechanism in a central aperture, said plate in turn having in a manner as described above with reference to the fixing of the height adjustment mechanism, U-shaped hooks for engagement in the anchorage and additionally being provided with spring projections for engagement in catch apertures in the anchorage so that the fixing plate disposed displaceably on the carrier unit can be positioned accurately. Alternatively, a position-fixing screw can be provided instead of the spring projections.

In an alternative construction, the fixing element for the tightening mechanism or other functional elements is constructed as a U-shaped stirrup engaging around the same, the end faces of the limbs of the U having catch projections for engagement in the anchorage.

To fix the carrier unit at its bottom end in the region of the retractor, in this exemplified embodiment, a rotatable rod is provided which extends through the carrier unit and which at one end has a locking crank and at its other end a screw aperture to fix the rod non-rotatably after fitting. This rod can at the same time be adapted to be slidably engaged by the end of the lap part of the belt. The carrier unit is, in this case, constructed as a U-shaped plastic cover which accommodates the functional parts of the safety belt system on its inside and is adapted for connection to the anchorage; depending on the construction, however, the carrier unit may be a separate plastic part provided with an additional cover.

BRIEF DESCRIPTION OF THE DRAWINGS

In order that the invention may be more readily understood, and so that further features thereof may be appreciated the invention will now be described by way of example with reference to the accompanying drawings in which.

DESCRIPTIONS OF PREFERRED EMBODIMENTS

Figure 1:
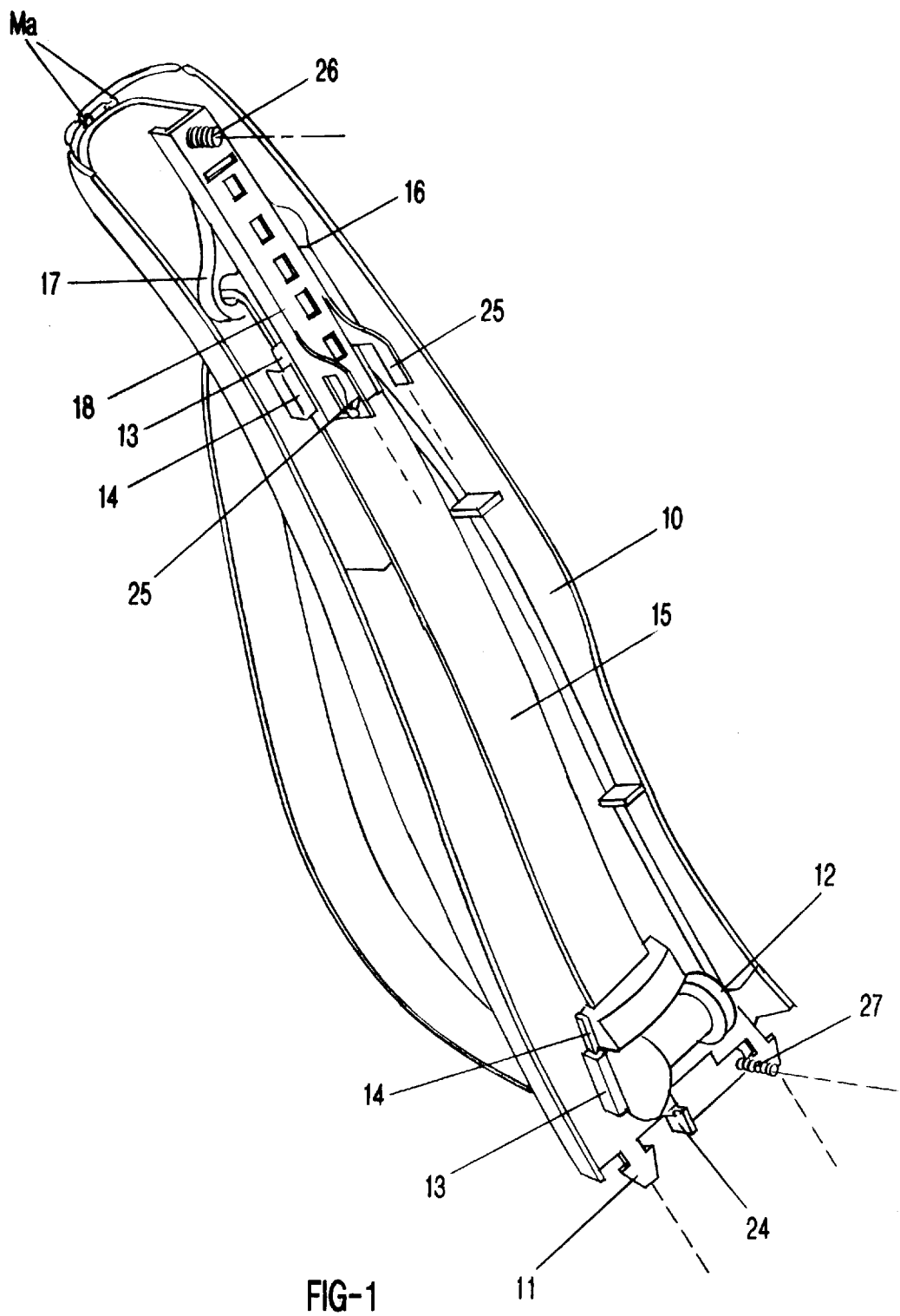
FIG. 1 is a perspective rear view of a carrier unit with a height adjustment mechanism and belt retractor pre-fitted.

FIG. 1 shows a carrier unit 10 which in this exemplified embodiment is itself made of plastic and is adapted to be fitted to the B- or C-column of a motor vehicle or part of the passenger seat. The B- or C-column and the seat parts are fixed to the vehicle and hence can act as anchorages. At its top and bottom ends the carrier unit 10 has catches 11, 11a for fixing the carrier unit 10 on the anchorages during the final fitting of the carrier unit to B- or C-column, or to the seat.

A belt retractor 12 is pre-fitted on the carrier unit 10 in the bottom zone thereof and is guided for displacement by lateral displacement projections 14 formed on the belt retractor 12 which are received in axially extending parallel displacement rails 13 formed on the inside of the carrier unit 10. From the belt retractor 10 the belt 15 extends to a height adjustment mechanism 16, on which a pillar loop 17, provided behind the cover, is arranged for vertical adjustment in manner known per se on a catch rail 18. Lateral displacement projections 14 and axially extending parallel displacement rails 13 are again provided, on the height adjustment mechanism 16 and carrier unit 10 respectively in the same way as in connection with the fixing of the belt retractor 12. Both the retractor 12 and the height adjustment mechanism may be moved axially of the carrier unit 10.

Figure 2:
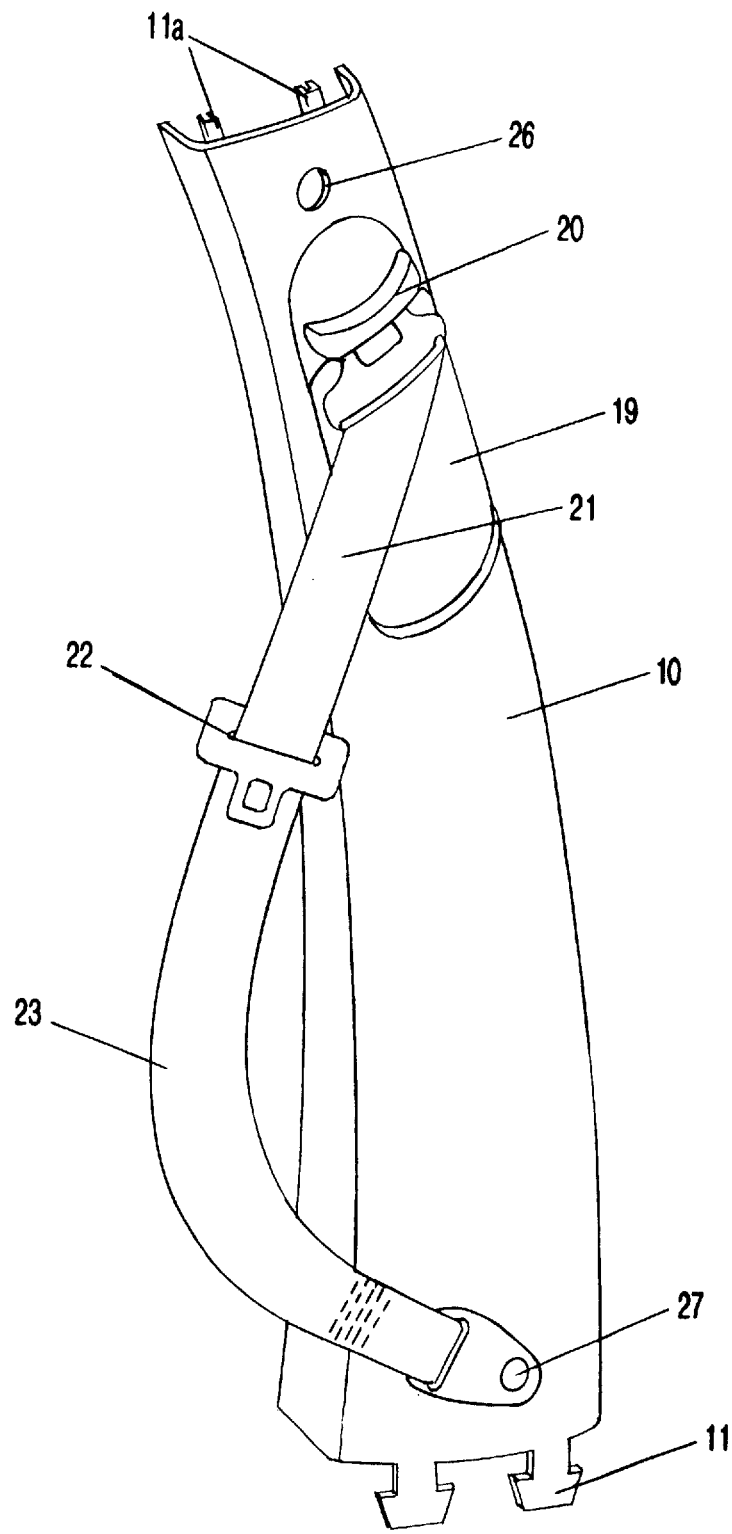
FIG. 2 is a front view of the carrier unit of FIG. 1.

As will be clearer from FIG. 2, the carrier unit 10 has a displaceable shutter 19 with a finger key 20 for actuating the height adjustment mechanism 16. The shoulder strap part 21 of the safety belt emerges through an aperture formed in the shutter 19. A tongue 22, adapted to be received in a seat belt buckle, is mounted on the strap dividing the shoulder strap part 21 from a lap belt part 23, the belt thus being a so-called three-point belt.

As will be seen from FIG. 1, the belt retractor 12 has at one side of the housing at its lower end an upwardly open U-shaped hook 24. At the lower end of the catch rail 18 facing the belt retractor and forming part of the height adjustment mechanism 16 two corresponding U-shaped hooks 25 are formed which are open towards the belt retractor 12.

When the carrier unit 10 constructed thus far is to be fitted on the anchorage, for example, the anchorage constituted by the B-column of the a motor vehicle the carrier unit 10 is placed in front of the said part, e.g. the B-column of the motor vehicle, and fixed in position by way of the catches 11, 11a. On tension being applied to the belt at the shoulder strap part 21 the belt retractor 12 locks, so that on further tension applied to the belt the retractor 12 and the catch rail 18 of the height adjustment mechanism 16 are moved towards one another. In these conditions, the U-shaped hooks 24, 25 engage corresponding openings provided for that purpose in the anchorage.

On completion of the displacement movement, in the exemplified embodiment illustrated, the carrier unit 10 is secured to the anchorage by way of screws 26, 27 provided at its top and bottom ends, the screws 26, 27 extending through the catch rail 18 of the height adjustment mechanism 16 and the housing of the belt retractor 12 so as to fix these functional parts so that they will not rattle on the anchorage, and so that they will not move axially relative to the anchorage. In the illustrated embodiment the screw 27 extends through the belt retractor 12 and is aligned with the U-shaped hook 24 of the belt retractor. In alternative embodiments two hooks 24 are provided on the belt retractor 10 and the screw 27 may be symmetrically arranged with regard to the hooks. In the exemplified embodiment illustrated, the screw 27 also fixes in position an end fitting of the lap part 23 of the strap, so that to this extent the screw 27 must be designed to take forces. However, other fixing points for the lap belt part 23 are possible, so that in that case a simple screw fastening of the carrier unit 10 on the anchorage is sufficient.

Figure 4:
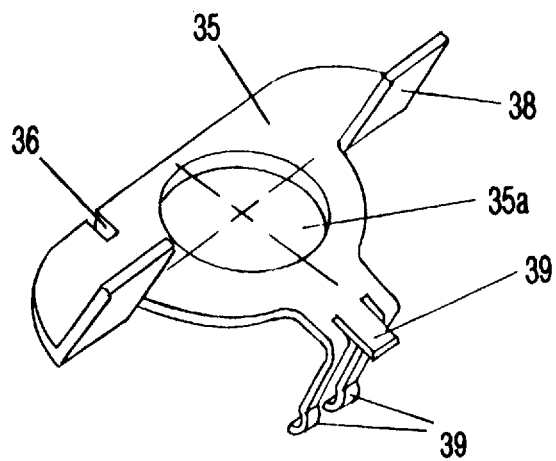
FIG. 4 is a detail of a fixing plate for the tightening mechanism, of the carrier of FIG. 3.
Figure 4A:
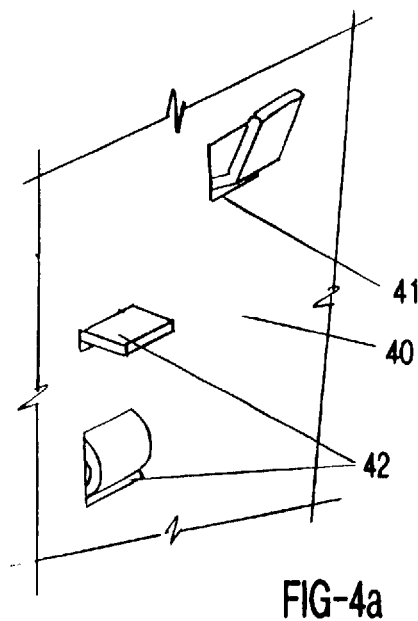
FIG. 4a is a partial elevation of an anchorage with a fixing plate as shown in FIG. 4 fitted thereon.

The screws 26, 27 may alternatively be replaced by corresponding snap-in or catch connections as described in detail, for example, with reference to FIGS. 4 and 4a.

Since the safety belt system thus finally fitted can only ever be loaded by tension applied to the belt with the belt retractor locked, this loading of the belt always results in the said functional parts moving towards one another, thus always ensuring a secure load-transmitting connection between the functional parts and the anchorage.

In an alternative embodiment, similar to that shown in FIGS. 1 and 2, it is sufficient to make just the height adjustment mechanism 16 displaceable, while the belt retractor 12 is disposed to be stationary on the carrier unit 10. In this arrangement the U-shaped hooks 24, 25 on the two functional parts must each point upwards. In a construction of this kind, the carrier unit 10 is fitted to the B- or C-column by displacing the carrier unit 10 upwards as a whole after initial positioning until the U-shaped hooks 24 of the belt retractor 12 engage the associated openings in the anchorage. The height adjustment mechanism 16 is then adjusted manually from outside relatively to the carrier unit 10 until the hooks on the adjustment mechanism engage the associated openings on the anchorage, to fix the adjustment mechanism. In this way the functional parts 12, 16 can be brought into operative connection with the anchorage.

Figure 3:
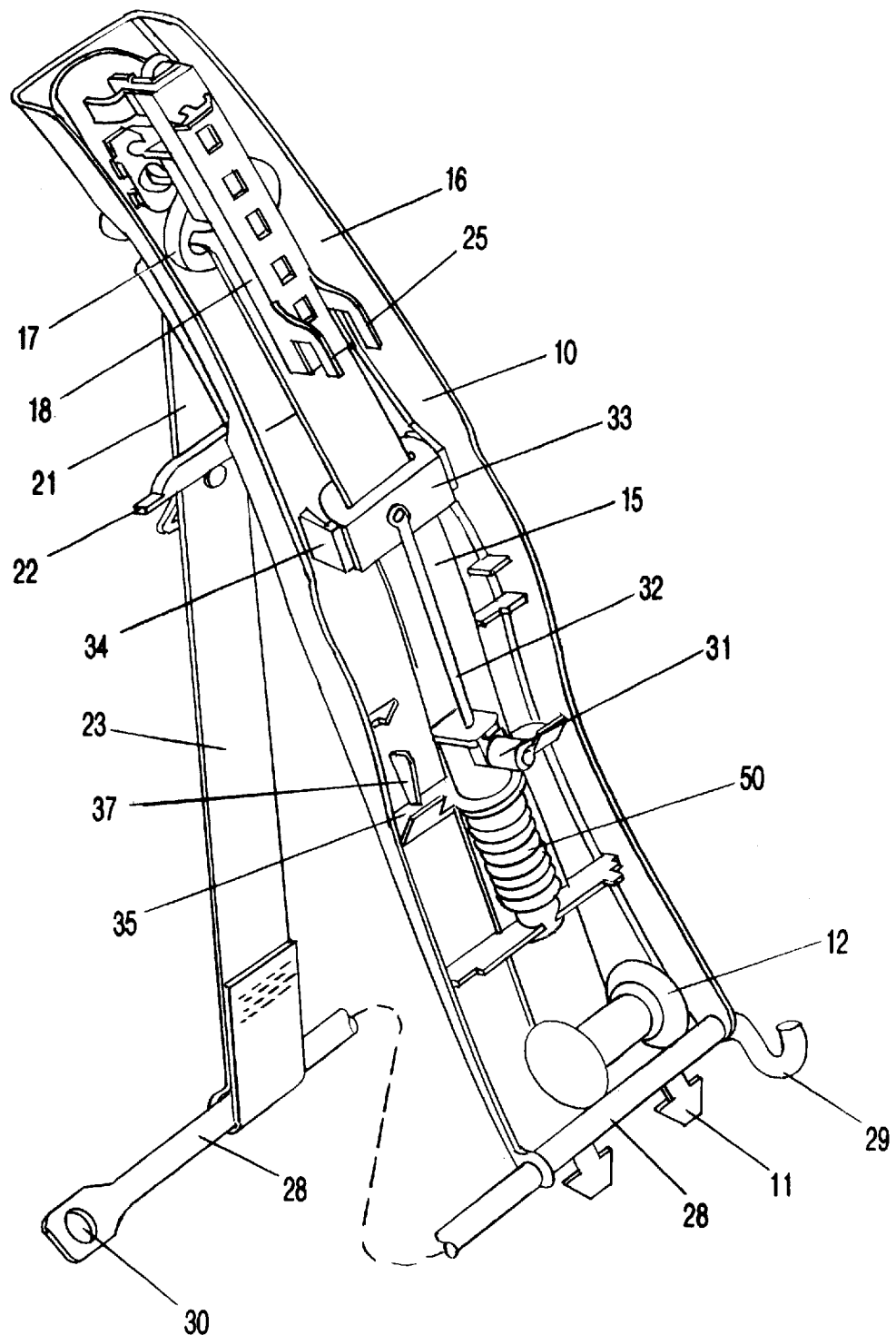
FIG. 3 is a perspective rear view of another carrier unit with a height adjustment mechanism, belt retractor, tightening mechanism and clamping mechanism pre-fitted.

FIG. 3 shows another embodiment of the invention in which, in addition to the height adjustment mechanism 16 and belt retractor 12 already described, a tightening mechanism 31 and a clamping device 33 coupled thereto are provided which are both pre-fitted on the carrier unit 10. The clamping mechanism 33 is so constructed in manner known per se as to respond to a sudden pulling out or tightening of the belt to clamp the belt securely to prevent any more belt from being pulled out. The clamping mechanism 33 is connected via a rod 32 to the tightening mechanism 31, and is guided for displacement via guide elements 34 shown laterally on the carrier unit 10. On actuation of the tightening mechanism 31 the clamping mechanism 33 is moved to tighten the strap clamped by the clamping mechanism 33. In these conditions, the clamping mechanisms 33 transmits the forces it takes via an intermediate force limiting mechanism 50 to the tightening mechanism 31. As a result, in the event of a crash the entire load is taken by the tightening mechanism 31 so that in the event of a crash the belt retractor 12 has no additional forces to take. In this exemplified embodiment of the invention, only the height adjustment mechanism 16 and the tightening mechanism 31 are arranged to be displaceable with respect to the final fitting of the carrier unit 10 on the anchorage and are provided with corresponding connections to such anchorage.

In this exemplified embodiment, the carrier unit is of such stability that in normal operation of the belt retractor 12 it can take the forces the retractor has to take. To fix the carrier unit 10 in this area, a rod 28 extending through the carrier unit 10 is arranged for rotation on the latter and at one end has a locking crank 29 while its other end has a screw aperture 30. The carrier unit 10 is then fixed on the anchorage by rotating the rod 28 until the locking crank 29 engages in an associated configuration on the anchorage, whereafter the rod 28 is fixed to be non-rotatable by means of an appropriate screw in the screw aperture 30.

It is to be observed that in this embodiment a loop formed at the end of the lap strap 23 is slidably mounted on the rod 28. The loop may slide from an operative position to a non-operative position. An arrangement of this type may be of especial use in a two-door motor vehicle.

FIG. 3 in conjunction with FIGS. 4 and 4a shows a first alternative for the pre-fitting of the tightening mechanism 31 on the carrier unit 10 and the operative connection of the tightening mechanism 31 to the anchorage; the relative construction for the pre-fitting and fixing of the height adjustment mechanism 16 corresponds to the exemplified embodiment described with reference to FIGS. 1 and 2.

In the alternative shown in FIGS. 3, 4 and 4a, the tightening mechanism 31 is fixed in the central aperture 35a of a fixing plate 35, the latter being held or guided for displacement at a projection 37 on the inside of the carrier unit 10 by means of a corrugation or groove 36. At the side of the carrier unit 10 which is thus open and faces the anchorage, the fixing plate 35 again has, like the construction in the case of the height adjustment mechanism 16, two upwardly extending projections 38, the fixing plate additionally being provided with corresponding catch and clip springs 39 (FIG. 4). For this purpose, FIG. 4a shows that the projections 38 engage in apertures 41 in a B-column 40, the catch and clip springs 39 simultaneously engaging in corresponding catch apertures 42 in the B-column.

The fitting of the carrier unit 10 is thus completed in the same way as explained in connection with the preceding exemplified embodiment, i.e. the carrier unit 10 is first locked on the anchorage by way of the rod 28 and then tension is applied to the belt to release the clamping mechanism 33. A further tension on the belt results in the vertical adjustment mechanism 16 and the fixing plate 35 with the tightening mechanism 31 disposed thereon moving towards one another until the corresponding U-hooks 25 and projections 38 with catch springs 39 engage in the associated apertures on the anchorage and thus establish the operative connection between the functional parts of the safety belt system and the anchorage.

Figure 5:
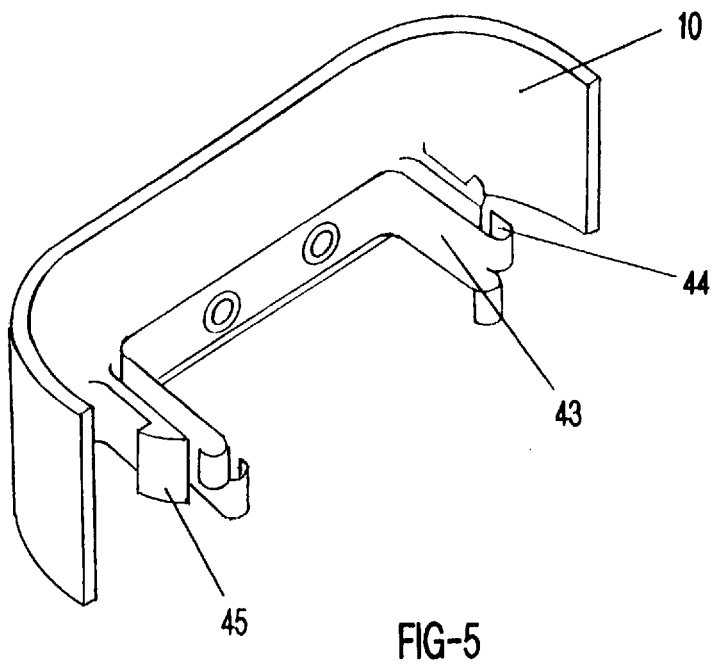
FIG. 5 is a detail of a fixing stirrup for the functional elements of a carrier unit of the types illustrated in FIGS. 1 and 3.

Referring now to FIG. 5 a U-shaped stirrup 43 is provided which may be used as an alternative to, or in addition to, the fixing arrangements described above for the functional parts mounted on the carrier unit.

In the arrangements described above the functional parts are connected to the carrier unit by cooperating projections and rails, such as projections 13 and rails 14, or by guide elements, such as the guide elements 34 which guide the clamping device. It is thought that if a vehicle in which such an arrangement is mounted is subjected to a side impact in excess of a specific severity, the main plastic part of the carrier unit may be deformed or damaged and the said projections and rails may be disengaged, or the guide elements may be disengaged from the elements that they guide. Similarly items that are fixed permanently in position on the main plastic part may become separated from the main plastic part.

The U-shaped stirrup 43 may be used, for example, as an alternative or additional fixing for the tightening mechanism 31, but could be used for others of the functional parts.

The stirrup 43 may be formed of metal and is mounted on the main plastic part of the carrier in a convenient manner. The stirrup has two projecting limbs, which extend from the main plastic part of the carrier towards the anchorage. The end face of each limb is provided with a catch arrangement 44 adapted to engage and be retained by the anchorage. The main part of the carrier also has projecting limbs with terminal enlargements 45 to engage the anchorage so that the main part of the carrier is held position. It is to be observed that the limbs 43 are effectively longer than the limbs with the terminal enlargements 45 to ensure that as the carrier 10 is fixed position initially the limbs 43 engage the anchorage, subsequently the limbs carrying the terminal enlargements 45 engage the anchorage. This ensures that stirrup 43 is correctly connected to the anchorage.

In the event of a side impact, even if the main plastic part of the carrier 10 is deformed or damaged the stirrup 43 will remain in position, acting to retain the functional parts in place.

The present invention is, of course, in no way restricted to the specific disclosure of the specification and drawings, but also encompasses any modifications within the scope of the appended claims.

What we claim is:

1. A safety belt carrier unit for mounting on a vehicle anchorage, said safety belt carrier unit comprising:
    a carrier unit;
    functional parts of a safety belt system connected to said carrier unit, wherein at least one of said functional parts is displaceable relative to said carrier unit;
    wherein, upon mounting said carrier unit on the vehicle anchorage, said at least one functional part becomes operatively connected to the vehicle anchorage upon displacement relative to said carrier unit.

2. A safety belt carrier unit according to claim 1, wherein said functional parts are selected from the group consisting of a belt retractor, a pillar loop, a height adjustment mechanism for a pillar loop, a clamping mechanism for a safety belt, and a tightening mechanism.

3. A safety belt carrier unit according to claim 2, wherein:
    said functional parts include said height adjustment mechanism and said belt retractor;
    said carrier unit has a top end and a bottom end;
    said height adjustment mechanism is displaceably connected to said top end;
    said belt retractor is connected to said bottom end;
    said height adjustment mechanism has at least one upwardly open U-shaped hook for engagement of the vehicle anchorage; and
    said belt retractor has at least one upwardly open U-shaped hook for engagement of the vehicle anchorage.

4. A safety belt carrier unit according to claim 3, further comprising catch means, wherein said height adjustment mechanism is fixed by said catch means in an end position after displacement.

5. A safety belt carrier unit according to claim 3, further comprising screws, wherein said carrier unit is fastened by said screws to the vehicle anchorage after completion of displacement, said screws extending through said height adjustment mechanism and said belt retractor, respectively, in respective end positions after displacement.

6. A safety belt carrier unit according to claim 5, wherein said screw extending through said belt retractor retains the lap part of the safety belt.

7. A safety belt carrier unit according to claim 2, wherein:
    said functional parts include said height adjustment mechanism and said belt retractor;
    said carrier unit has a top end and a bottom end;
    said height adjustment mechanism is displaceably connected to said top end;
    said belt retractor is displaceably connected to said bottom end;
    said height adjustment mechanism has at least one U-shaped hook, open toward said belt retractor, for engagement of the vehicle anchorage; and
    said belt retractor is displaceable and has at least one U-shaped hook, open toward said height adjustment mechanism, for engagement of the vehicle anchorage.

8. A safety belt carrier unit according to claim 7, further comprising catch means, wherein at least one of said height adjustment mechanism and said belt retractor is fixed by said catch means in an end position after displacement.

9. A safety belt carrier unit according to claim 7, further comprising screws, wherein said carrier unit is fastened by said screws to the vehicle anchorage after completion of displacement, said screws extending through said height adjustment mechanism and said belt retractor, respectively, in end positioned thereof after displacement.

10. A safety belt carrier unit according to claim 9, wherein said screw extending through said belt retractor retains the lap part of the safety belt.

11. A safety belt carrier unit according to claim 1, further comprising snap-in/catch connections for retaining said carrier unit on the vehicle anchorage.

12. A safety belt carrier unit according to claim 2, wherein:
    said functional parts include said height adjustment mechanism, said belt retractor, said tightening mechanism, and said clamping mechanism, said tightening mechanism disposed on said belt retractor and said clamping mechanism connected to said tightening mechanism, wherein said height adjusting mechanism and said tightening mechanism are displaceably connected to said carrier unit to become operatively connected to the vehicle anchorage upon displacement relative to said carrier unit.

13. A safety belt carrier unit according to claim 12, further comprising a fixing element displaceably connected to said carrier unit, wherein said tightening mechanism is connected to said fixing element, wherein said fixing element becomes operatively connected to the vehicle anchorage upon displacement relative to said carrier unit, wherein said carrier unit has a top end and a bottom end, and wherein said height adjusting mechanism is connected to said top end and has at least one U-shaped hook, open toward said tightening mechanism, for engaging the vehicle anchorage.

14. A safety belt carrier unit according to claim 13, wherein said belt retractor is stationarily connected to said carrier unit.

15. A safety belt carrier unit according to claim 13, wherein:
    said fixing element is a fixing plate with a central aperture for receiving said tightening mechanism;

said fixing plate has a hook open toward said height adjusting mechanism for engaging the vehicle anchorage;

said fixing plate has spring projections for engaging catch apertures of the vehicle anchorage.

16. A safety belt carrier unit according to claim 13, wherein said fixing element is a U-shaped stirrup with limbs engaging said tightening mechanism, wherein said limbs have end faces with catch projections for engaging the vehicle anchorage.

17. A safety belt carrier unit according to claim 12, further comprising a force limiter unit connected to said carrier unit, wherein said tightening mechanism is connected to said force limiter unit.

18. A safety belt carrier unit according to claim 12, further comprising a rotatable rod having a locking crank for engaging the vehicle anchorage and a screw aperture for non-rotatably fastening said rod is provided, wherein said rod is located at an end of said carrier unit to which said belt retractor is connected.

19. A safety belt carrier unit according to claim 18, wherein said rod supports the lap part of the safety belt.

20. A safety belt carrier unit according to claim 1, comprising a U-shaped stirrup with limbs engaging at least one of said functional parts, wherein said limbs have end faces with catch projections for engaging the vehicle anchorage.

21. A safety belt carrier unit according to claim 1, wherein said carrier unit is a U-shaped plastic cover enclosing said functional parts and connected to the vehicle anchorage.

22. A safety belt carrier unit according to claim 21, wherein said cover has a stability sufficient to withstand loads to which said belt retractor is subjected during normal operation.

23. A safety belt carrier unit according to claim 1, wherein the vehicle anchorage is selected from the group consisting of the B-column and C-column of the vehicle.

24. A safety belt carrier unit according to claim 1, wherein the vehicle anchorage is a seat of the vehicle.

\* \* \* \* \*